US007815304B2

(12) United States Patent
Ahn

(10) Patent No.: US 7,815,304 B2
(45) Date of Patent: Oct. 19, 2010

(54) PRINT MEDIUM STACKING UNIT AND IMAGE FORMING APPARATUS WITH THE SAME

(75) Inventor: Byung-sun Ahn, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 664 days.

(21) Appl. No.: 11/367,368

(22) Filed: Mar. 6, 2006

(65) Prior Publication Data

US 2006/0197820 A1 Sep. 7, 2006

(30) Foreign Application Priority Data

Mar. 4, 2005 (KR) ...................... 10-2005-0018134

(51) Int. Cl.

| | |
|---|---|
| ***B41J 29/13*** | (2006.01) |
| ***B41J 2/385*** | (2006.01) |
| ***B41J 2/41*** | (2006.01) |
| ***B41J 2/435*** | (2006.01) |
| ***G03G 13/04*** | (2006.01) |
| ***G03G 15/00*** | (2006.01) |
| ***G01D 15/28*** | (2006.01) |
| ***G01D 15/06*** | (2006.01) |
| ***G01D 15/10*** | (2006.01) |

(52) U.S. Cl. ....................... 347/108; 347/138; 347/152; 347/170; 347/222; 347/245; 347/263

(58) Field of Classification Search ................. 347/108, 347/138, 152, 170, 222, 245, 263; 346/145; 400/691, 692, 693
See application file for complete search history.

(56) References Cited

U.S. PATENT DOCUMENTS

| | | | | |
|---|---|---|---|---|
| 5,454,553 A * | 10/1995 | Firl et al. | ................... | 271/4.04 |
| 5,523,848 A * | 6/1996 | Musso et al. | ................ | 358/296 |
| 5,537,195 A * | 7/1996 | Sagara et al. | ............... | 399/381 |
| 5,567,068 A * | 10/1996 | Egashira et al. | ............. | 400/625 |
| 6,053,493 A * | 4/2000 | Yokoyama et al. | .......... | 271/171 |
| 6,106,178 A * | 8/2000 | Chiu | .......................... | 400/624 |
| 6,693,728 B1 * | 2/2004 | Kinoshita et al. | ........... | 358/296 |
| 6,709,177 B1 * | 3/2004 | Sugimura | ................... | 400/605 |
| 6,830,401 B1 * | 12/2004 | Hwang et al. | ............... | 400/693 |
| 6,991,331 B2 * | 1/2006 | Kagami et al. | .............. | 347/108 |
| 7,263,326 B2 * | 8/2007 | Amagai | ...................... | 399/393 |
| 7,290,952 B2 * | 11/2007 | Kagami | ...................... | 400/693 |

(Continued)

FOREIGN PATENT DOCUMENTS

EP 930771 A2 * 7/1999

(Continued)

OTHER PUBLICATIONS

Office Action issued in Korean Patent Application No. 2005-18134 on Apr. 25, 2006.

*Primary Examiner*—Stephen D Meier
*Assistant Examiner*—Leonard S Liang
(74) *Attorney, Agent, or Firm*—Staas & Halsey LLP

(57) ABSTRACT

A paper stacking unit and an image forming apparatus having the same, the paper stacking unit including: a base frame supporting a print media, a cover pivotally connected to the base frame and supporting the print media together with the base frame, and a plate connected to the cover for auxiliarily supporting the print media.

36 Claims, 5 Drawing Sheets

U.S. PATENT DOCUMENTS 7,658,490 B2 * 2/2010 Hwang et al. ............... 347/108

FOREIGN PATENT DOCUMENTS

| | | |
|---|---|---|
| JP | 08-239126 | 9/1996 |
| JP | 2001-002282 | 1/2001 |
| JP | 2001-225973 | 8/2001 |
| JP | 2002-167083 | 6/2002 |
| KR | 10-137456 | 6/1998 |
| KR | 2000-61863 | 10/2000 |
| KR | 2002-64191 | 8/2002 |
| KR | 2004-22372 | 3/2004 |
| KR | 2004-36213 | 4/2004 |

* cited by examiner

PRINT MEDIUM STACKING UNIT AND IMAGE FORMING APPARATUS WITH THE SAME

CROSS-REFERENCE TO RELATED PATENT APPLICATION

This application claims the benefit of Korean Patent Application No. 10-2005-0018134, filed on Mar. 4, 2005, in the Korean Intellectual Property Office, the disclosure of which is incorporated herein by reference.

BACKGROUND OF THE INVENTION

1. Field of the Invention

Aspects of the present invention relate to an image forming apparatus, and more particularly, to an image forming apparatus with a print medium stacking unit for stacking multiple sheets of print media.

2. Description of the Related Art

In general, an image forming apparatus prints a desired image by: forming an electrostatic latent image on a photosensitive medium using an exposing unit, such as laser scanning unit, in response to a digital image signal; developing a toner image by supplying a toner to the electrostatic latent image; transferring the toner image onto a print medium; and fixing the toner image on the print medium by applying heat and pressure to the toner image.

Image forming apparatuses are classified into a dry type and a wet type according to a state of a toner and carrier used. The wet-type dry image forming apparatuses are also classified into two types: an apparatus having a one-phase developing device, and an apparatus having a two-phase developing device.

The one-phase developing device forms an image by supplying only a toner to the electrostatic latent image, while the two-phase developing device forms an image by supplying a carrier mixed with toner particles to the electrostatic latent image.

With regard to the one-phase developing device, after the toner is applied onto a photosensitive medium to develop a toner image, the toner left on a surface of the photosensitive medium is removed by a cleaning blade, and is recovered by a recovery unit to recycle the toner.

With regard to the two-phase developing device, the carrier is not supplied to the photosensitive medium, though it is still reused. However, after only toner particles are supplied onto the photosensitive medium to develop the toner image, the toner particles left on a surface of the photosensitive medium are removed by a cleaning blade, and recovered by a recovery unit to recycle the toner.

Multifunction peripherals combining both scanning and printing operations have been widely utilized. A multi-function peripheral includes a scanning unit and a printing unit. The scanning unit is disposed on an upper portion of the printing unit, and scans a document and inputs an image of the document to the printing unit. The printing unit receives a digital image signal corresponding to the image of the document inputted from the scanning unit, and prints an image corresponding to the image onto a print medium.

However, due to the multi-functional quality of the peripheral, this apparatus has a large size. Thus, to reduce the size of the apparatus, a size of the print medium stacking unit must be decreased since the size of the main components for scanning/printing are difficult to reduce.

SUMMARY OF THE INVENTION

According to an aspect of the present invention, there is provided an image forming apparatus with a print medium stacking unit detachably mounted to a body of the image forming apparatus, the print medium stacking unit having a variable length corresponding to a size of the print media.

The print medium stacking unit comprises: a base frame for supporting a print media; a cover pivotally connected to the base frame and supporting the print media together with the base frame; and a plate coupled to the cover for auxiliarly supporting the recording medium.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
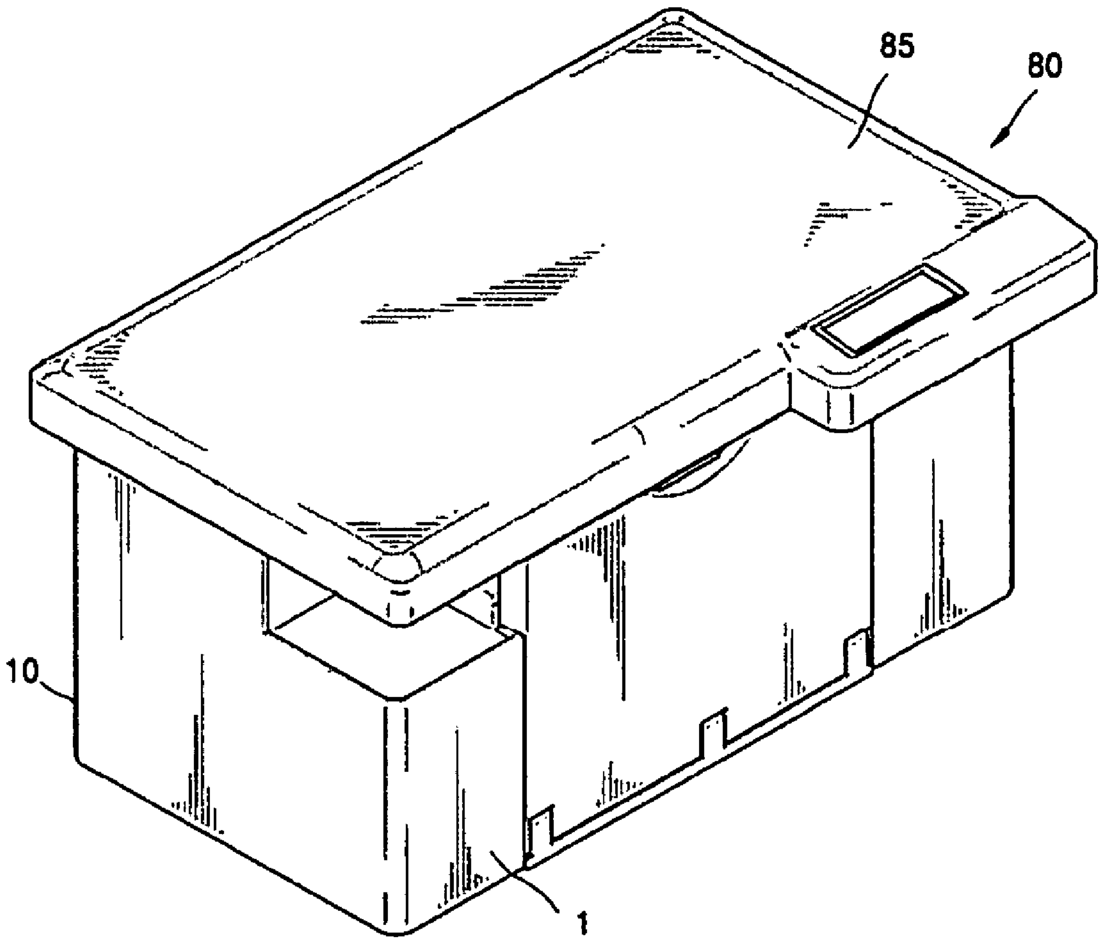
FIG. 1 is a perspective view of an image forming apparatus having a print medium stacking unit according to an embodiment of the present invention.
Figure 2:
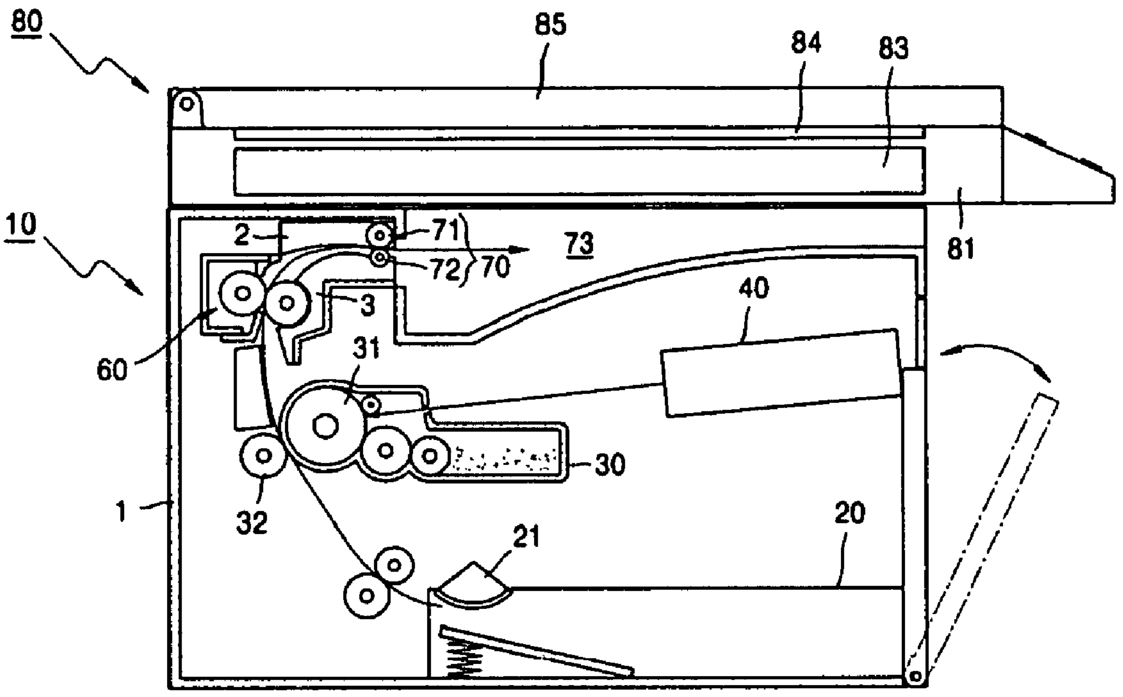
FIG. 2 is a cross-sectional view schematically illustrating the image forming apparatus shown in FIG. 1.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Referring to FIGS. 1, 2, 3, and 4, an image forming apparatus according to an embodiment of the present invention includes a printing section 10, a scanning section 80, and a delivery section 73 disposed between the printing section 10 and the scanning section 80 for delivering a print medium with a toner image fixed thereon.

The printing section 10 prints an image on the print medium, and includes a print medium stacking unit 20, a developing unit 30, a transfer roller 32, a fixing unit 60, and a delivery unit 70.

The print medium stacking unit 20 is detachably provided under a body 1 of the image forming apparatus to stack sheets of print media therein. A pickup roller 21 is provided above the print medium stacking unit 20 to pick up the print media one sheet at a time. The print medium picked up by the pickup roller 21 is transferred along a transfer path, and is delivered to the delivery section 73 through a transferring and fixing process of the image.

The print medium stacking unit 20 includes a base frame 22, a cover 23, and a plate 24. The base frame 22, the cover 23, and the plate 24 are connected to each other to support the print media.

The base frame 22 is detachably mounted to the body 1 to support the print media. Guide bosses 223 for guiding an operation of attaching/detaching the base frame 22 to/from the body 1 are provided on both sides of the base frame 22. The base frame 22 has a knock-up plate 221 for pushing the print media upward, and a print media width guide 222 sliding to the left and right according to a width of the print media and supporting the print media.

The base frame 22 has a connecting portion 224 connected to the cover 23, and a pivot restricting portion 226 for restricting the movement of the cover 23 within a range of an acute angle.

A plurality of the connecting portions 224 are provided at a rear side of the base frame 22 at regular intervals, each connecting portion having a connecting boss 225 which is inserted into a hole 231 formed in the cover 23.

The pivot restricting portion 226 is provided at a rear side of the base frame 22 to support and restrict the rotation of the cover 23. The pivot restricting portion 226 is disposed between the connecting portions 224.

Figure 5:
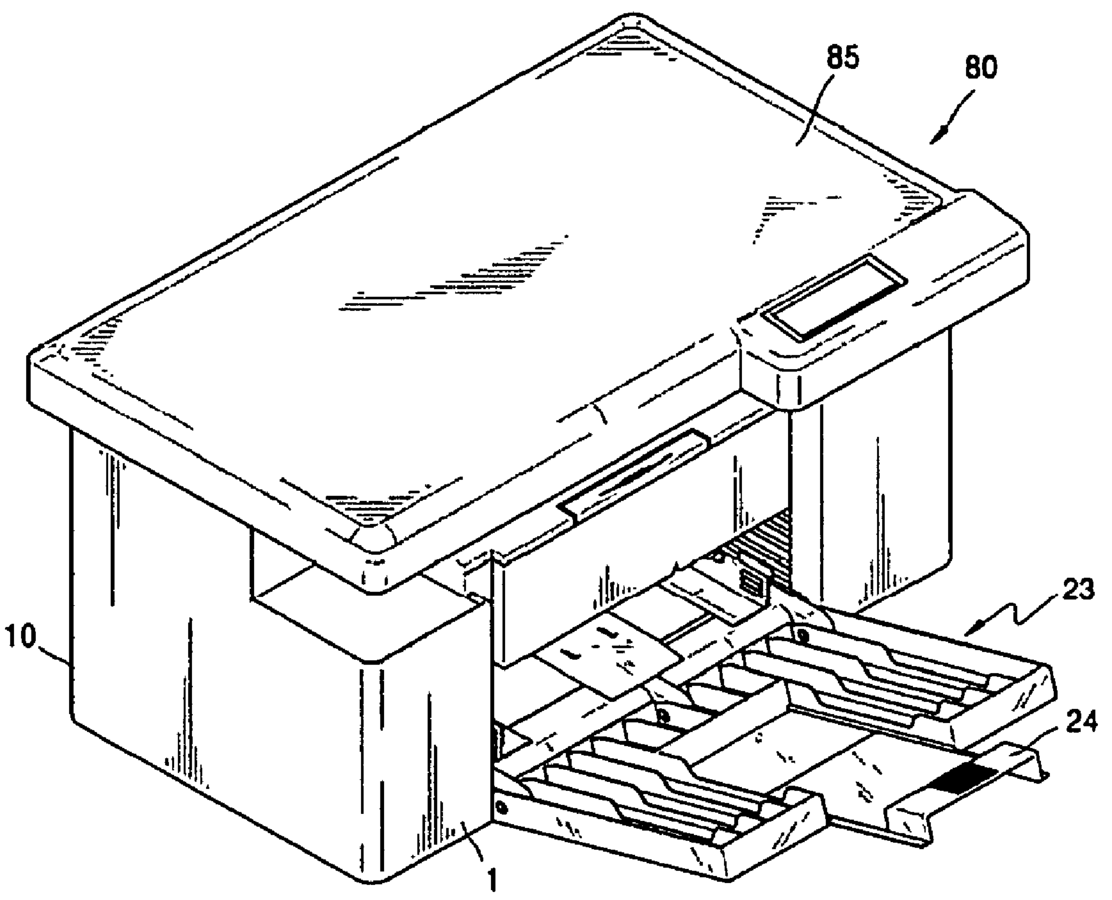
FIG. 5 is a perspective view illustrating a cover and a plate of the print medium stacking unit shown in FIG. 1.

The cover 23 is pivotally attached to the base frame 22 to support a portion of the print media. When the cover 23 is vertically folded to the base frame 22, the cover 23 covers a front surface of the body 1. Meanwhile, when the cover 23 is unfolded from the base frame 22, the cover 23 accommodates the print media, as shown in FIG. 5.

Figure 3:
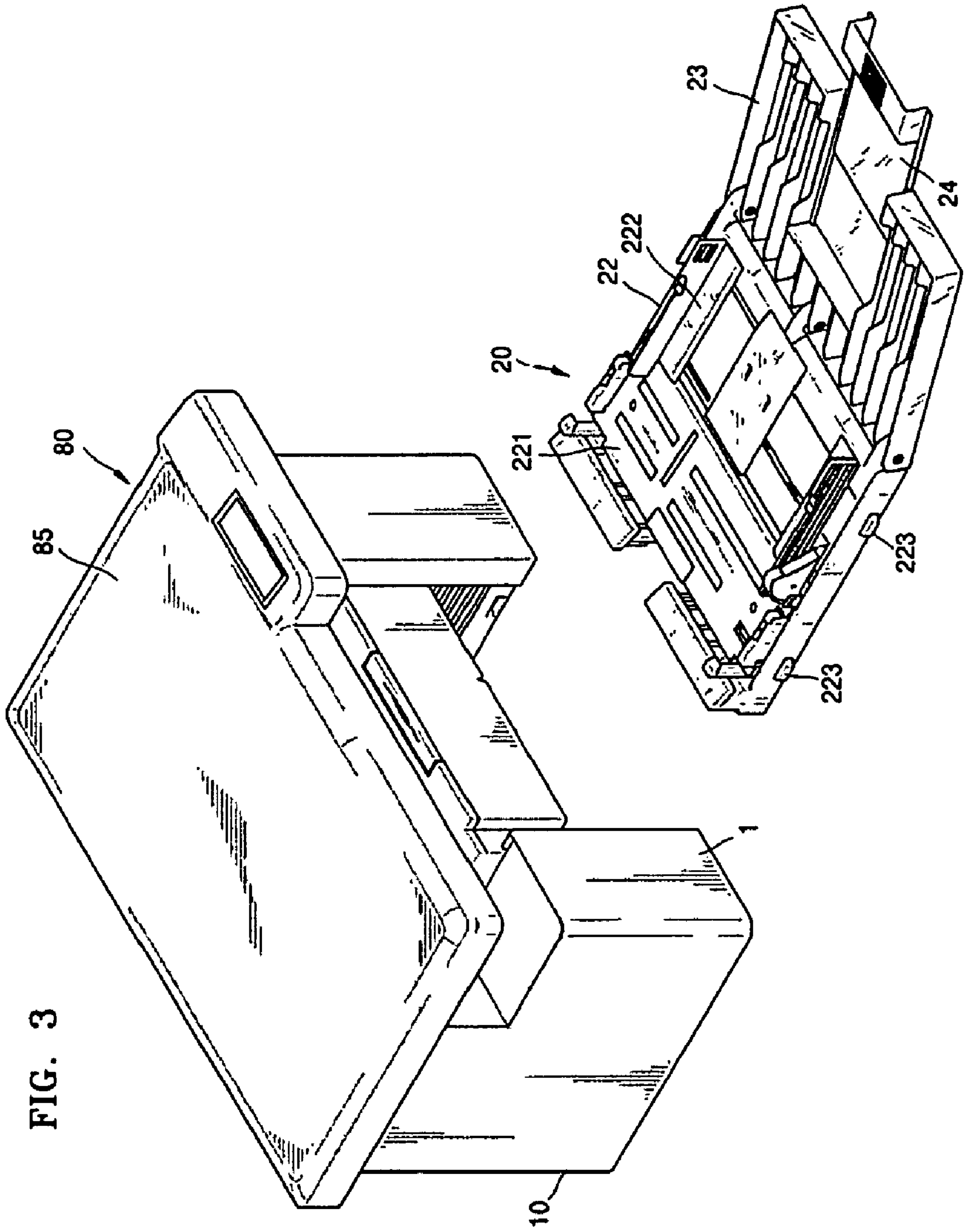
FIG. 3 is a perspective view illustrating a state in which the print medium stacking unit shown in FIG. 1 is detached from a body of the image forming apparatus.
Figure 4:
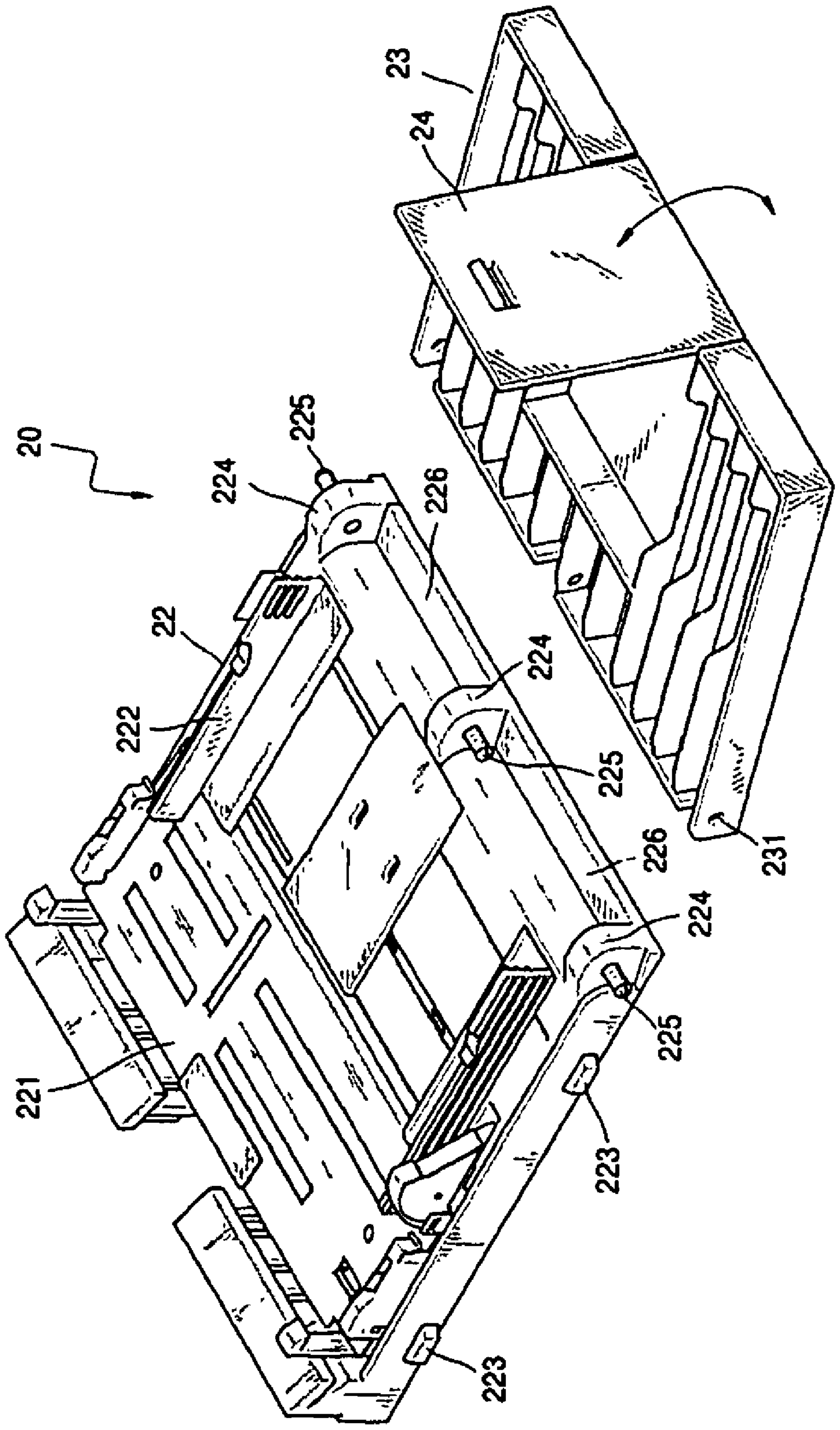
FIG. 4 is a perspective view illustrating the print medium stacking unit of FIG. 1.

The plate 24 is slidably attached to the cover 23, as shown FIG. 3, or is pivotally attached to the cover 23, as shown in FIG. 4.

The developing unit 30 includes a photosensitive drum 31. An electrostatic latent image is formed on a surface of the photosensitive drum 31 charged to a desired potential by irradiating light from an exposing unit 40 (for example, a laser scanning unit). The photosensitive drum 31 is oppositely in contact with the transfer roller 32, when the print medium passes between them. The developing unit 30 is filled with a toner supplied to the photosensitive drum 31 to develop the electrostatic latent image as the toner image.

The transfer roller 32 presses the print medium, which passes between the photosensitive drum 31 and the transfer roller 32, against the photosensitive drum 31 with a predetermined pressure, so as to transfer the toner image formed on the photosensitive drum 31 onto the print medium.

The fixing unit 60 applies heat and pressure to the toner image transferred onto the print medium to fix the toner image onto the print medium, while the print medium passes between the photosensitive drum 31 and the transfer roller 32.

The delivery unit 70 delivers the print medium with the toner image fixed thereon by the fixing unit 60 to the delivery section 73.

The scanning section 80 is disposed on the body 1 to irradiate light onto a document (not shown) to scan a document, and includes a scanning frame 81 fixed to the upper portion of the body 1, and a cover 85 pivotally attached to the scanning frame 81.

A glass plate 84 is disposed on the scanning frame 81, and an image sensor 83 is slidably disposed below the glass plate to scan the document (not shown) placed flat on the glass plate 84 and to input a digital signal corresponding to the document.

The delivery unit 70 includes a delivery roller 71 rotatably supported on a delivery guide rib 2, and a delivery idler roller 72 rotatably supported on a delivery idler guide rib 3 and in contact with the delivery roller 71.

When the print medium picked up from the print medium stacking unit 20 passes through the developing unit 30 and the fixing unit 60, the electrostatic latent image is developed on the print medium as the toner image. After the toner mage is fixed on the print medium, the print medium passes through the delivery roller 72 and the delivery idler roller 72, and is discharged and stacked on the delivery section 73.

The print medium stacking unit according to the present invention has the following advantages.

First, since the print medium stacking unit is detachably mounted in the body of the apparatus and supports the print media, the space occupied by the image forming apparatus can be reduced.

Second, since the cover can be replaced by a cover of a different color, the aesthetic design of the apparatus can be improved.

Finally, misfeeding of the print media due to slippage thereof can be prevented by restricting the movement of the cover within a range of an acute angle.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A print medium stacking unit for an image forming apparatus, the print medium stacking unit comprising:
- a base frame supporting at least a portion of a print medium to be supplied to the image forming apparatus;
- a cover pivotally connected to the base frame and supporting at least a portion of the print medium together with the base frame; and
- a plate connected to the cover to auxiliarily support the print medium;
- wherein the plate is expandable from the cover to support various sizes of print media with the cover and the base frame, and the cover forms a portion of an external appearance of the image forming apparatus when the cover covers a front open surface of the image forming apparatus.

2. The print medium stacking unit as claimed in claim 1, wherein the base frame comprises a connecting portion connected to the cover.

3. The print medium stacking unit as claimed in claim 2, wherein the base frame further comprises a pivot restricting portion restricting a movement of the cover.

4. The print medium stacking unit as claimed in claim 3, wherein the movement of the cover is restricted to within a range of an acute angle with respect to the base frame.

5. The print medium stacking unit as claimed in claim 2, wherein a connection boss formed at the cover is accommodated into a hole formed in the connection portion.

6. The print medium stacking unit as claimed in claim 2, wherein the connection portion includes a connection boss which is accommodated into a hole formed in the cover.

7. The print medium stacking unit as claimed in claim 2, wherein a plurality of connection portions are provided on the base frame, each of the connection portions including one of a hole formed therein and a connection boss.

8. The print medium stacking unit as claimed in claim 7, wherein the plurality of connection portions are provided on the base frame at regular intervals.

9. The print medium stacking unit as claimed in claim 1, wherein the plate is slidably connected to the cover.

10. The print medium stacking unit as claimed in claim 1, wherein the plate is pivotally connected to the cover.

11. The print medium stacking unit as claimed in claim 10, wherein the plate pivots in a vertical direction with respect to a plane of the cover.

12. The print medium stacking unit as claimed in claim 1, wherein a first size print medium fits within a body of the image forming apparatus which is expandable to hold larger sizes of print medium.

13. The print medium stacking unit as claimed in claim 1, wherein the print medium stacking unit is detachably mounted to a body of the image forming apparatus.

14. The print medium stacking unit as claimed in claim 1, wherein the cover forms a front surface of the image forming apparatus.

15. The print medium stacking unit as claimed in claim 1, wherein the print medium stacking unit is a supply unit of the print medium or a discharge unit of the print medium.

16. The print medium stacking unit as claimed in claim 1, wherein the print medium stacking unit functions as both a supply unit of the print medium and a discharge unit of the print medium.

17. The print medium stacking unit as claimed in claim 1, wherein the base frame is connected to a body of the image forming apparatus.

18. The print medium stacking unit as claimed in claim 1, wherein the base frame and a body of the image forming apparatus are formed integrally.

19. An image forming apparatus comprising:

a body comprising a scanning unit and/or a printing unit, the scanning unit scanning a document and inputting an image of the document to the printing unit and the printing unit printing the image; and a print medium stacking unit comprising:

a base frame supporting at least a portion of a print medium to be supplied to the image forming apparatus;

a cover pivotally connected to the base frame and supporting at least a portion of the print medium together with the base frame; and a plate connected to the cover to auxiliarily support the print medium;

wherein the plate is expandable from the cover to support various sizes of print media with the cover and the base frame, and the cover forms a portion of an external appearance of the image forming apparatus when the cover covers a front open surface of the image forming apparatus.

20. The image forming apparatus as claimed in claim 19, wherein the base frame comprises a connecting portion connected to the cover.

21. The image forming apparatus as claimed in claim 20, wherein the base frame further comprises a pivot restricting portion restricting a movement of the cover.

22. The image forming apparatus as claimed in claim 21, wherein the movement of the cover is restricted to within a range of an acute angle with respect to the base frame.

23. The image forming apparatus as claimed in claim 20, wherein a connection boss formed at the cover is accommodated into a hole formed in the connection portion.

24. The image forming apparatus as claimed in claim 20, wherein the connection portion includes a connection boss which is accommodated into a hole formed in the cover.

25. The image forming apparatus as claimed in claim 20, wherein a plurality of connection portions are provided on the base frame, each of the connection portions including one of a hole formed therein and a connection boss.

26. The image forming apparatus as claimed in claim 25, wherein the plurality of connection portions are provided on the base frame at regular intervals.

27. The image forming apparatus as claimed in claim 19, wherein the plate is slidably connected to the cover.

28. The image forming apparatus as claimed in claim 19, wherein the plate is pivotally connected to the cover.

29. The image forming apparatus as claimed in claim 28, wherein the plate pivots in a vertical direction with respect to a plane of the cover.

30. The image forming apparatus as claimed in claim 19, wherein a first size print medium fits within the body of the image forming apparatus which is expandable to hold larger sizes of print medium.

31. The image forming apparatus as claimed in claim 19, wherein the print medium stacking unit is detachably mounted to the body of the image forming apparatus.

32. The image forming apparatus as claimed in claim 19, wherein the cover forms a front surface of the image forming apparatus.

33. The image forming apparatus as claimed in claim 19, wherein the print medium stacking unit is a supply unit of the print medium or a discharge unit of the print medium.

34. The image forming apparatus as claimed in claim 19, wherein the print medium stacking unit functions as both a supply unit of the print medium and a discharge unit of the print medium.

35. The image forming apparatus as claimed in claim 19, wherein the base frame is connected to the body of the image forming apparatus.

36. The image forming apparatus as claimed in claim 19, wherein the base frame and a body of the image forming apparatus are formed integrally.

* * * * *